US007081508B2

(12) United States Patent
Matsuda et al.

(10) Patent No.: US 7,081,508 B2
(45) Date of Patent: Jul. 25, 2006

(54) PRIMER COMPOSITION

(75) Inventors: Takashi Matsuda, Gunma-ken (JP); Yasuhisa Osawa, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/875,603

(22) Filed: Jun. 25, 2004

(65) Prior Publication Data

US 2005/0288474 A1    Dec. 29, 2005

(51) Int. Cl.
    *C08G 77/24* (2006.01)
(52) U.S. Cl. .................... 528/42; 528/17; 106/287.14; 106/287.16; 556/448; 556/488
(58) Field of Classification Search ........... 106/287.14, 106/287.16; 528/42, 17, 18; 556/448, 488
    See application file for complete search history.

(56) References Cited

U.S. PATENT DOCUMENTS

| 4,681,636 | A | * | 7/1987 | Saito et al. ............ 106/287.15 |
| 5,322,557 | A | * | 6/1994 | Inomata et al. ......... 106/287.14 |
| 5,326,844 | A | * | 7/1994 | Fujiki et al. .................. 528/15 |
| 5,656,711 | A |   | 8/1997 | Fukuda et al. |
| 5,665,846 | A |   | 9/1997 | Sato et al. |
| 5,674,967 | A | * | 10/1997 | Goodwin ..................... 528/42 |
| 5,705,591 | A | * | 1/1998 | Matsuda et al. .............. 528/42 |
| 6,087,519 | A | * | 7/2000 | Garnier et al. .............. 556/419 |
| 6,297,339 | B1 |   | 10/2001 | Osawa et al. |
| 6,512,041 | B1 |   | 1/2003 | Osawa et al. |
| 6,552,152 | B1 |   | 4/2003 | Sakano et al. |
| 6,576,737 | B1 |   | 6/2003 | Shiono et al. |
| 6,624,231 | B1 | * | 9/2003 | Shiono ..................... 524/492 |
| 2003/0180467 | A1 | * | 9/2003 | Malik ..................... 427/385.5 |
| 2004/0006160 | A1 |   | 1/2004 | Matsuda et al. |

FOREIGN PATENT DOCUMENTS

| EP | 0 725 113 A1 | 8/1996 |
| EP | 0 765 916 A2 | 4/1997 |
| EP | 0 967 251 A1 | 12/1999 |
| EP | 1 167 453 A2 | 1/2002 |
| EP | 1 325 942 A1 | 7/2003 |
| JP | 9-95615 A | 4/1997 |
| JP | 11-116684 A | 4/1999 |
| JP | 2990646 B2 | 10/1999 |
| JP | 2000-007835 A | 1/2000 |
| JP | 2002-012769 A | 1/2002 |
| JP | 2002-105319 A | 4/2002 |
| JP | 2003-201401 A | 7/2003 |

* cited by examiner

*Primary Examiner*—Margaret G. Moore
(74) *Attorney, Agent, or Firm*—Birch, Stewart, Kolasch & Birch, LLP

(57) ABSTRACT

A primer composition comprises (a) a fluoroalkylene or fluoropolyether compound having at least one alkenyl radical and at least one hydrolyzable silyl radical, (b) an organic titanic acid ester, (c) an organic tin compound, and (d) a silane compound. The primer composition is fully adherent to various substrates of metals, glass, ceramics, cement, mortar, carbon, and plastics, and is particularly suited for use with a thermosetting elastomer composition based on a polymer having at least two alkenyl radicals and a perfluoropolyether structure in its backbone.

10 Claims, No Drawings

PRIMER COMPOSITION

TECHNICAL FIELD

This invention relates to primer compositions which are fully adherent to various substrates of inorganic materials such as metals, glass, ceramics, cement and mortar, carbon, and organic materials such as plastics, and which are particularly suited for use in combination with thermosetting elastomer compositions.

BACKGROUND ART

Thermosetting elastomer compositions primarily comprising a polymer having at least two alkenyl radicals in a molecule and a perfluoropolyether structure in its backbone cure into elastomers having good properties of heat resistance, chemical resistance, solvent resistance and water resistance. At the same time, these compositions are good in parting properties and thus, regrettably difficult to bond. JP-A 9-95615 and JP-A 2002-105319 describe such elastomer compositions to which various compounds having an alkoxysilyl radical, epoxy radical, carboxyl radical or acid anhydride residue are internally added as adhesive aids for tailoring the compositions so as to be adherent to metals, glass, ceramics and plastics. The addition of some adhesive aids, however, has negative impact that the mechanical strength of rubber lowers or the compression set declines.

In order to bond the elastomer compositions to various substrates at no sacrifice of such physical properties, a primer must be used rather than the internal addition of adhesive aids.

Commercially available primers include a silane primer based on a silane coupling agent, a primer based on synthetic rubber, a primer based on an acrylic resin, a primer based on a urethane resin, and a primer based on an epoxy resin.

These primers fail to achieve a satisfactory bond since they have low affinity to the above-referred thermosetting elastomer compositions and are less wettable at the interface.

SUMMARY OF THE INVENTION

An object of the invention is to provide a primer composition which has good affinity to thermosetting elastomer compositions primarily comprising a polymer having at least two alkenyl radicals in a molecule and a perfluoropolyether structure in its backbone and which effectively adheres to various substrates.

It has been found that a primer composition comprising (a) a fluoroalkylene or fluoropolyether compound having at least one alkenyl radical and at least one hydrolyzable silyl radical in a molecule, (b) an organic titanic acid ester, (c) an organic tin compound, and (d) a silane compound is effectively adherent to various substrate. When used prior to the application of a thermosetting elastomer composition primarily comprising a polymer having at least two alkenyl radicals in a molecule and a perfluoropolyether structure in its backbone, the primer composition establishes a tight bond between the elastomer composition and various substrates.

Accordingly, the invention provides a primer composition comprising as essential components, (a) a fluoroalkylene compound or fluoropolyether compound having at least one alkenyl radical and at least one hydrolyzable silyl radical in a molecule, (b) an organic titanic acid ester, (c) an organic tin compound, and (d) a silane compound.

The primer composition is best suited for use with a thermosetting elastomer composition primarily comprising a polymer having at least two alkenyl radicals in a molecule and a perfluoropolyether structure in its backbone.

DESCRIPTION OF THE PREFERRED EMBODIMENTS

Component (a)

A first essential component (a) in the inventive primer composition is a fluoroalkylene or fluoropolyether compound having at least one alkenyl radical and at least one hydrolyzable silyl radical in a molecule. It is preferably derived from a fluoroalkylene or fluoropolyether compound. The alkenyl radicals in these compounds are those having a $CH_2$=$CH$— structure at an end such as, for example, vinyl, allyl, propenyl, isopropenyl, butenyl, and hexenyl radicals, with the vinyl and allyl being especially preferred. The alkenyl radicals may be attached either directly to ends of the backbone of the fluoroalkylene or fluoropolyether compound or through a divalent linkage.

The hydrolyzable silyl radicals are those capable of reacting with water to form a siloxane bond (Si—O—Si bond) such as, for example, alkoxysilyl, acetoxysilyl, isopropenoxysilyl and chlorosilyl radicals. The hydrolyzable silyl radicals may be attached either directly to ends of the backbone of the fluoroalkylene or fluoropolyether compound or through a divalent linkage.

The fluoroalkylene compounds include those containing a structure represented by the general formula:

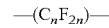

wherein n is an integer of 2 to 20, which may be straight or branched.

The fluoropolyether compound has a perfluoroalkyl ether structure, for example, of the following general formula:

wherein Rf is a straight or branched perfluoroalkylene radical of 1 to 6 carbon atoms, preferably 1 to 3 carbon atoms, and letter q is an integer of 1 to 500, preferably 2 to 400, more preferably 10 to 200.

Examples of the recurring units -(Rf-O)— are shown below.

—$CF_2O$—, —$CF_2CF_2O$—, —$CF_2CF_2CF_2O$—,
—$CF(CF_3)CF_2O$—, —$CF_2CF_2CF_2CF_2O$—,
—$CF_2CF_2CF_2CF_2CF_2CF_2O$—, and —$C(CF_3)_2O$—.

Of these, —$CF_2O$—, —$CF_2CF_2O$—, —$CF_2CF_2CF_2O$—, and —$CF(CF_3)CF_2O$— are preferred.

It is understood that the perfluoroalkyl ether structure may consist of recurring units -(Rf-O)— of one type or recurring units of two or more types.

Typical of the fluoroalkylene or fluoropolyether compound (a) are those of the following general formula (1).

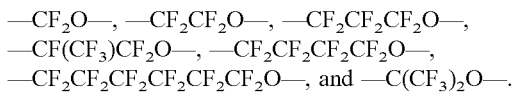 (1)

Herein A is —CH=$CH_2$ or a hydrolyzable silyl radical,

X and X' are independently divalent linkage radicals, X is —$CH_2$—, —$CH_2O$— or —Y—$NR^1$—CO—, wherein Y is —$CH_2$— or a radical of the following structural formula (Z):

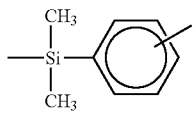
(Z)

(the bond may be at o, m or p-position) and $R^1$ is hydrogen, methyl, phenyl or allyl, X' is —$CH_2$—, —$OCH_2$— or —CO—$NR^2$—Y'—, wherein Y' is —$CH_2$— or a radical of the following structural formula (Z'):

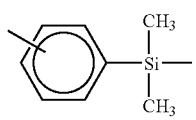
(Z')

(the bond may be at o, m or p-position) and $R^2$ is hydrogen, methyl, phenyl or allyl, letter p is independently equal to 0 or 1, r is independently equal to 0 or 1, and Rf' is a fluoroalkylene or fluoropolyether radical.

In case Rf' is a fluoroalkylene radical, a typical example has the following formula:

wherein n is an integer of 2 to 20. In case Rf' is a fluoropolyether radical, a typical example is a radical represented by the following formula (1'):

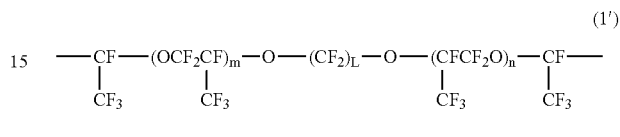
(1')

wherein L is an integer of 2 to 6, and m and n each are an integer of 0 to 200, preferably 5 to 100. These fluoroalkylene and fluoropolyether compounds typically have a molecular weight of about 400 to 100,000 and preferably about 1,000 to 50,000.

Illustrative examples of the fluoroalkylene and fluoropolyether compounds of formula (1) are given below.

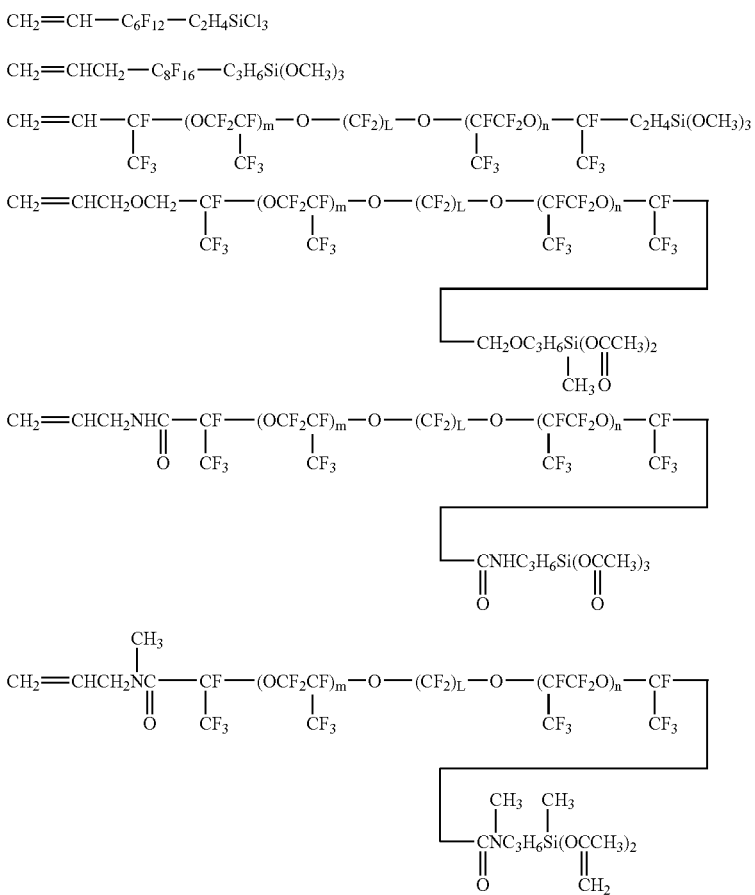

-continued

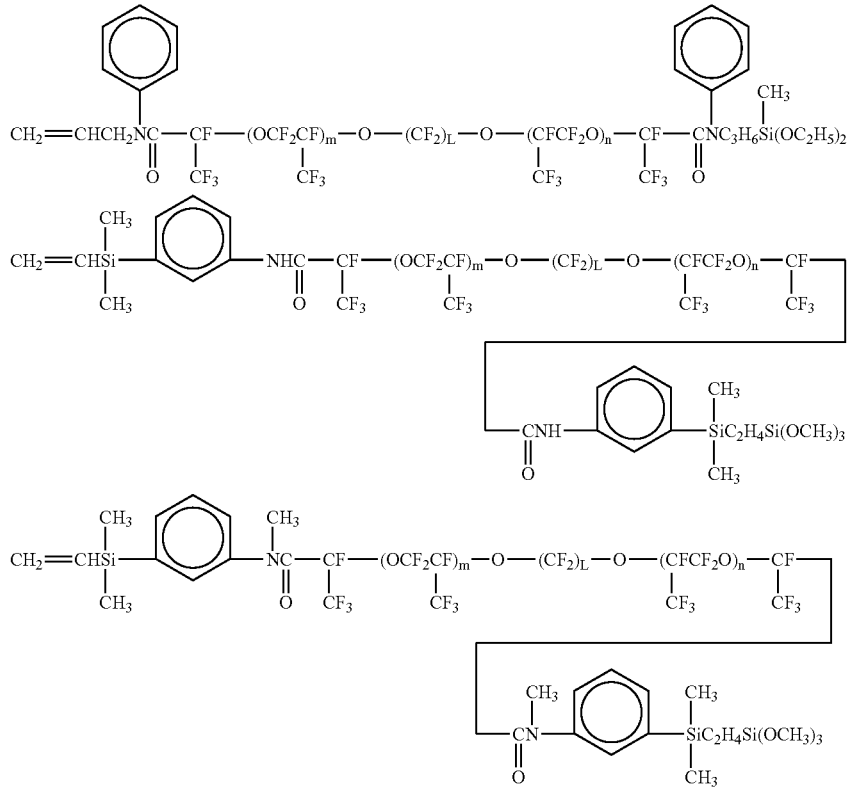

In the formulae, L, m and n are as defined for formula (1').

These fluoroalkylene and fluoropolyether compounds may be used alone or in admixture of two or more.

Component (b)

A second essential component (b) in the inventive primer composition is an organic titanic acid ester. The organic titanic acid ester is typically selected from among organic titanic acid esters, chelate compounds of titanium, chelate compounds of titanium with silicates, titanate coupling agents, and partial hydrolytic condensates thereof. Examples of suitable organic titanic acid esters include tetraisopropyl titanate, tetra-n-butyl titanate, butyl titanate dimer, tetrakis(2-ethylhexyl)titanate, tetrastearyl titanate, tetramethyl titanate, diethoxybis(acetylacetonato)titanium, diisopropylbis(acetylacetonato)titanium, diisopropoxybis(ethylacetoacetate)titanium, isopropoxy(2-ethyl-1,3-hexanediolato)titanium, di(2-ethylhexoxy)bis(2-ethyl-1,3-hexanediolato) titanium, di-n-butoxybis(triethanolaminato)titanium, titanium tetraacetylacetonate, hydroxybis(lactato)titanium, and partial hydrolytic condensates thereof.

Of the organic titanic acid esters, compounds of the general formula:

$$Ti(OR^3)_4$$

wherein $R^3$ is independently a substituted or unsubstituted monovalent hydrocarbon radical of 1 to 10 carbon atoms are preferred since they exert more crosslinking and adhesion enhancing effects. Exemplary of the monovalent hydrocarbon radicals represented by $R^3$ are alkyl, alkoxyalkyl, alkenyl and aryl radicals.

The organic titanic acid esters may be used alone or in admixture of two or more.

Preferably the organic titanic acid ester (b) is compounded in an amount of 0.1 to 50 parts by weight, more preferably 0.2 to 20 parts by weight per 100 parts by weight of the fluoroalkylene or fluoropolyether compound (a). Outside the range, less amounts of the organic titanic acid ester may lead to a decline of adhesion to substrates (adherends) whereas more amounts of the organic titanic acid ester may result in a shorter open time, inefficient working and a loss of storage stability.

Component (c)

A third essential component (c) in the inventive primer composition is an organic tin compound. Examples of the organic tin compound include dibutyltin dimethoxide, dibutyltin diacetate, dibutyltin dioctate, dibutyltin dilaurate, dibutyltin dioleate, dibutyltin distearate, dioctyltin diacetate, dioctyltin dilaurate, and diethyltin dioleate.

The organic tin compounds may be used alone or in admixture of two or more.

Preferably the organic tin compound (c) is compounded in an amount of 0.01 to 10 parts by weight, more preferably 0.02 to 5 parts by weight per 100 parts by weight of the fluoroalkylene or fluoropolyether compound (a). If the amount of the organic tin compound is below the range, reaction of hydrolyzable silyl radicals on the fluoroalkylene or fluoropolyether compound (a) may be retarded, failing to achieve satisfactory adhesion. Too much amounts of the organic tin compound may result in a shorter open time, inefficient working and a loss of storage stability.

Component (d)

A fourth essential component (d) in the inventive primer composition is a silane compound. Typical are silane compounds of the following formula:

$$R^4_a Si(OR^5)_{4-a}$$

wherein $R^4$ is an organo radical, $R^5$ is an alkyl radical, and "a" is 0, 1 or 2, and preferably 0 or 1. The alkyl radical represented by $R^5$ is preferably selected from those having 1 to 6 carbon atoms, more preferably 1 to 3 carbon atoms, with methyl and ethyl being especially preferred.

The organo radical represented by $R^4$ is preferably selected from substituted or unsubstituted monovalent hydrocarbon radicals having 1 to 15 carbon atoms, more preferably 1 to 12 carbon atoms. Included are unsubstituted monovalent hydrocarbon radicals, for example, alkyl radicals such as methyl, ethyl, propyl, butyl, isobutyl, tert-butyl and hexyl, aryl radicals such as phenyl and tolyl, and alkenyl radicals such as vinyl and allyl; and substituted monovalent hydrocarbon radicals, for example, monovalent hydrocarbon radicals containing epoxy groups such as glycidyl and glycidoxy groups, monovalent hydrocarbon radicals containing (meth)acrylic groups such as (meth)acrylic and (meth)acryloxy groups, monovalent hydrocarbon radicals containing amino groups such as amino and aminoalkylamino groups, ureido group-containing monovalent hydrocarbon radicals, halogen atom-containing monovalent hydrocarbon radicals, mercapto group-containing monovalent hydrocarbon radicals, and isocyanate group-containing monovalent hydrocarbon radicals.

Specific examples of the silane compound include tetramethoxysilane, tetraethoxysilane, methyltrimethoxysilane, propyltrimethoxysilane, methyltriethoxysilane, vinyltrimethoxysilane, vinyltriethoxysilane, dimethyldimethoxysilane, phenyltrimethoxysilane, diphenyldimethoxysilane, phenyltriethoxysilane, γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, β-(3,4-epoxycyclohexyl)ethyltriethoxysilane, p-styryltrimethoxysilane, 3-methacryloxypropylmethyldimethoxysilane, 3-methacryloxypropyltrimethoxysilane, 3-acryloxypropyltrimethoxysilane, N-(2-aminoethyl)-3-aminopropylmethyldimethoxysilane, N-(2-aminoethyl)-3-aminopropyltrimethoxysilane, N-(2-aminoethyl)-3-aminopropyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, 3-ureidopropyltriethoxysilane, 3-chloropropyltrimethoxysilane, 3-mercaptopropylmethyldimethoxysilane, 3-mercaptopropyltrimethoxysilane, and 3-isocyanatopropyltriethoxysilane.

The silane compounds may be used alone or in admixture of two or more.

Preferably the silane compound (d) is compounded in an amount of 0.1 to 50 parts by weight, more preferably 1 to 30 parts by weight per 100 parts by weight of the fluoroalkylene or fluoropolyether compound (a). Outside the range, less amounts of the silane compound may lead to a decline of adhesion to substrates (adherends). Too much amounts of the silane compound may adversely affect the affinity to the thermosetting elastomer composition and eventually, adhesion.

Other Components (Solvent, Filler, etc.)

A solvent may be added to the primer composition for adjusting the primer composition to an appropriate viscosity for coating operation. The type of solvent is not particularly limited as long as components (a) to (d) are dissolvable therein. Examples of suitable solvents include hydrocarbon solvents such as toluene, xylene, heptane, hexane and petroleum solvents, halogenated solvents such as trichloroethylene, ester solvents such as ethyl acetate and butyl acetate, ketone solvents such as acetone, methyl ethyl ketone and methyl isobutyl ketone, alcohol solvents such as methanol, ethanol and isopropanol, silicone solvents such as hexamethylcyclotrisiloxane, octamethylcyclotetrasiloxane and decamethylcyclopentasiloxane, and fluoro solvents such as trifluoromethylbenzene, 1,3-bistrifluoromethylbenzene and HCFC-225. These solvents may be used alone or in admixture of two or more.

If desired, various fillers may be used in the inventive primer composition. Examples of suitable fillers include wood meal, pulp, cotton chips, asbestos, glass fibers, carbon fibers, mica, walnut shell flour, rice hull flour, graphite, diatomaceous earth, china clay, fumed silica, precipitated silica, silicic anhydride, carbon black, calcium carbonate, magnesium carbonate, clay, talc, titanium oxide, cerium oxide, ground quartz, finely divided aluminum, iron oxide, flint powder, and zinc powder. These fillers may be used alone or in admixture of two or more.

To the inventive primer composition, various other additives may be added if necessary. Suitable additives include antioxidants, radical inhibitors, metal deactivating agents, ozone degradation preventing agents, storage stability improvers, tackifiers, pigments, and dyes.

Thermosetting Elastomer Composition

The inventive primer composition is suited for use with various thermosetting elastomer compositions, and best suited for use with a thermosetting elastomer composition primarily comprising a polymer having at least two alkenyl radicals in a molecule and a perfluoropolyether structure in its backbone. The preferred thermosetting elastomer composition comprises the above polymer, a compound having at least two, preferably at least three SiH radicals in a molecule, and a platinum group catalyst whereby heat cure takes place through hydrosilylation reaction. Thermosetting elastomer compositions of this type are disclosed in Japanese Patent No. 2,990,646, JP-A 11-116684 and JP-A 2002-12769. Thermosetting elastomer compositions comprising the above polymer and an organic peroxide whereby cure takes place through peroxide crosslinking are also useful as disclosed in JP-A 2000-7835 and JP-A 2003-201401.

Application and Use

The inventive primer composition is effective for establishing a firm bond between the thermosetting elastomer composition and various substrates including metals such as iron, stainless steel, aluminum, nickel, zinc, gold, silver and copper, substrates surface plated with such metals, plastics such as acrylic resins, phenolic resins, epoxy resins, polycarbonate resins, and polybutylene terephthalate resins, inorganic materials such as carbon, glass, ceramics, cement, slate, stone (e.g., marble, granite), mortar, and the like.

The inventive primer composition can be applied to substrates by any of commonly used coating techniques, for example, brush coating, spray coating, wire bar, blade, roll coating, and dipping techniques.

From the inventive primer composition, the desired coating can be formed by drying in air at room temperature for 1 to 60 minutes, preferably 5 to 30 minutes, and heating at 50 to 180° C., preferably 80 to 150° C. for 1 to 60 minutes, preferably 5 to 30 minutes.

EXAMPLE

Examples are given below by way of illustration and not by way of limitation. Note that Me is methyl and pbw is parts by weight.

Preparation Example 1

Typical Thermosetting Elastomer Composition

To 100 pbw of a polymer of formula (2) having a viscosity of 5,500 cs, an average molecular weight of 15,3000 and a vinyl content of 0.012 mol/100 g, was added 20 pbw of fumed silica treated with a mixture of hexamethyldisilazane and 1,3-divinyl-1,1,3,3-tetramethyldisilazane and having a specific surface area of 200 m²/g. They were mixed, heat treated and further milled on a three-roll mill. To the mixture were added 3.36 pbw of a fluorinated organosilicon compound of formula (3), 0.2 pbw of a toluene solution of a catalyst in the form of chloroplatinic acid modified with $CH_2=CHSiMe_2OSiMe_2CH=CH_2$ (platinum concentration 0.5 wt %), and 0.4 pbw of a 50% toluene solution of ethynyl cyclohexanol. They were mixed, obtaining Composition A. It was confirmed that Composition A cured into a rubber on heating at 150° C. for 10 minutes.

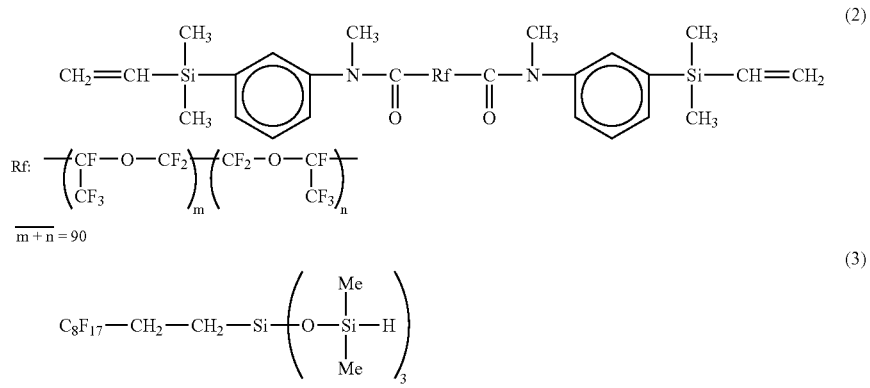

Example 1

A vessel equipped with a stirrer was charged with 10 pbw of a fluoroalkylene compound of formula (4), 2.0 pbw of tetra-n-butoxytitanate, 0.4 pbw of 3-aminopropyltriethoxysilane, 0.8 pbw of tetraethoxysilane, 0.2 pbw of dioctyltin dilaurate, 40 pbw of ethyl acetate, and 40 pbw of n-heptane. The ingredients were homogeneously dissolved, obtaining Primer Composition I.

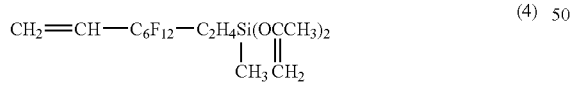

Example 2

A vessel equipped with a stirrer was charged with 10 pbw of a fluoropolyether compound of formula (5), 1.5 pbw of tetraisopropoxytitanate, 1.0 pbw of γ-glycidoxypropyltrimethoxysilane, 0.5 pbw of vinyltrimethoxysilane, 0.2 pbw of dibutyltin diacetate, 60 pbw of methyl isobutyl ketone, 20 pbw of 1,3-bistrifluoromethylbenzene, and 5 pbw of isopropyl alcohol. The ingredients were homogeneously dissolved, obtaining Primer Composition II.

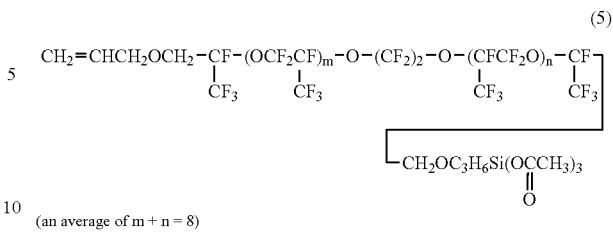

(an average of m + n = 8)

Example 3

A vessel equipped with a stirrer was charged with 10 pbw of a fluoropolyether compound of formula (6), 1.0 pbw of tetra-n-butoxytitanate, 0.8 pbw of vinyltrimethoxysilane, 0.3 pbw of 3-aminopropyltriethoxysilane, 0.2 pbw of dibutyltin diacetate, 40 pbw of 1,3-bistrifluoromethylbenzene, and 40 pbw of ethyl acetate. The ingredients were homogeneously dissolved, obtaining Primer Composition III.

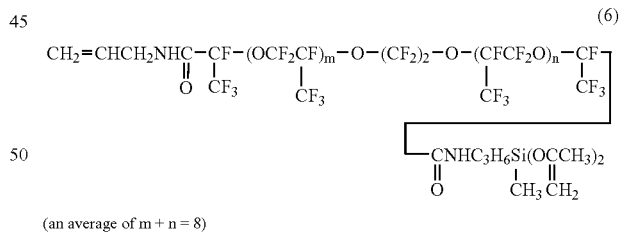

(an average of m + n = 8)

Example 4

A vessel equipped with a stirrer was charged with 10 pbw of a fluoropolyether compound of formula (7), 2.0 pbw of tetra-n-butoxytitanate, 1.0 pbw of tetraethoxysilane, 1.5 pbw of γ-glycidoxypropyltrimethoxysilane, 0.1 pbw of dibutyltin dimethoxide, 50 pbw of 1,3-bistrifluoromethylbenzene, and 30 pbw of methyl isobutyl ketone. The ingredients were homogeneously dissolved, obtaining Primer Composition IV.

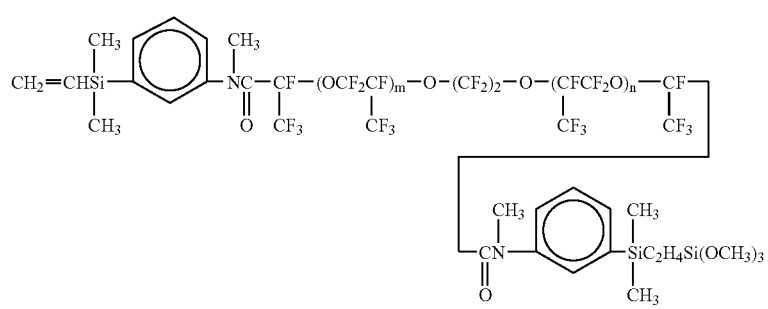

(7)

(an average of m + n = 13)

Comparative Example 1

A vessel equipped with a stirrer was charged with 2.0 pbw of tetra-n-butoxytitanate, 1.0 pbw of tetraethoxysilane, 1.5 pbw of γ-glycidoxypropyltrimethoxysilane, 0.1 pbw of dibutyltin dimethoxide, 25 pbw of n-heptane, and 15 pbw of methyl isobutyl ketone. The ingredients were homogeneously dissolved, obtaining Primer Composition V.

Each of Primer Compositions I to V of Examples 1 to 4 and Comparative Example 1 was brush coated onto test pieces (100 mm×25 mm×1 mm) of iron, aluminum, stainless steel SUS314, glass, phenolic resin and epoxy resin, air dried at room temperature for 15 minutes, and heat treated at 120° C. for 15 minutes. On the surface of the primer, a frame was placed so as to define a bead of 100 mm×2 mm×2 mm. The thermosetting elastomer composition (Composition A) of Preparation Example 1 was cast and heat cured at 150° C. for 30 minutes. The integral molded piece was measured for bond strength according to JIS K-6854-1, using a 90-degree peel bond strength tester. The results are shown in Table 1.

As seen from Table 1, Primer Compositions I to IV within the scope of the invention firmly adhere to various adherends. In contrast, Primer Composition V (Comparative Example 1) which is free of the fluoroalkylene and fluoropolyether compounds has less affinity to the thermosetting elastomer composition (Composition A) of Preparation Example 1 so that peeling occurred at the interface between the rubber and the primer.

There have been described primer compositions which are fully adherent to various substrates of inorganic materials such as metals, glass, ceramics, cement and mortar, carbon, and organic materials such as plastics, and which are particularly suited for use with a thermosetting elastomer composition primarily comprising a polymer having at least two alkenyl radicals in a molecule and a perfluoropolyether structure in its backbone.

Although some preferred embodiments have been described, many modifications and variations may be made thereto in light of the above teachings. It is therefore to be understood that the invention may be practiced otherwise

TABLE 1

Bond strength and peeled (broken) state

Unit: N/mm

| Adherend | Example 1 Composition I | Example 2 Composition II | Example 3 Composition III | Example 4 Composition IV | Comparative Example 1 Composition V |
|---|---|---|---|---|---|
| Iron | 3.1 rubber break | 2.8 rubber break | 3.0 rubber break | 2.7 rubber break | 0.5 rubber/primer interfacial peel |
| Aluminum | 2.8 rubber break | 2.7 rubber break | 2.9 rubber break | 3.0 rubber break | 0.4 rubber/primer interfacial peel |
| SUS314 | 2.7 rubber break | 2.5 rubber break | 2.9 rubber break | 2.8 rubber break | 0.5 rubber/primer interfacial peel |
| Phenolic resin | 2.9 rubber break | 3.3 rubber break | 2.6 rubber break | 3.1 rubber break | 0.5 rubber/primer interfacial peel |
| Epoxy resin | 2.9 rubber break | 3.1 rubber break | 3.0 rubber break | 3.0 rubber break | 0.6 rubber/primer interfacial peel | than as specifically described without departing from the scope of the appended-claims.

Japanese Patent Application No. 2003-125374 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A primer composition comprising (a) a fluoroalkylene or fluoropolyether compound having at least one alkenyl radical and at least one hydrolyzable silyl radical in a molecule and having the following general formula (1):

$$A\text{-}(C_2H_4)_r\text{—}(X)_p\text{—}Rf\text{-}(X')_p\text{—}(C_2H_4)_r\text{-}A \qquad (1)$$

wherein A is an alkenyl radical or a hydrolyzable silyl radical, X and X' are independently divalent linkage radicals, X is —CH$_2$—, —CH$_2$O—, or —Y—NR$^1$—CO—, wherein Y is —CH$_2$—or a radical of the following structural formula (Z):

and R$^1$ is hydrogen, methyl, phenyl, or allyl, X' is —CH$_2$—, —OCH$_2$—, or —CO—NR$^2$—Y'—, wherein Y' is —CH$_2$— or a radical of the following structural formula (Z'):

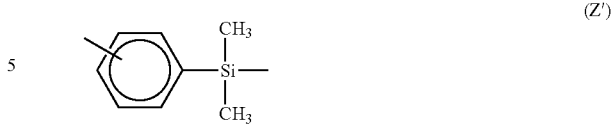

and R$^2$ is hydrogen, methyl, phenyl or allyl, "p" is independently equal to 0 or 1, "r" is independently equal to 0 or 1, and Rf is a fluoroalkylene fluoroalkylene radical having the general formula:

—(C$_n$F$_{2n}$)— wherein n is an integer of 2 to 20, or a fluoropolyether radical having the following formula:

-(Rf-O)$_q$— wherein Rf is a straight or branched perfluoroalkylene radical of 1 to 6 carbon atoms, and "q" is an integer of 1 to 500, (b) an organic titanic acid ester,
   (c) an organic tin compound, and
   (d) a silane compound.

2. The primer composition of claim 1, wherein component (b) is present in an amount of 0.1 to 50 parts by weight per 100 parts by weight of component (a).

3. The primer composition of claim 1, wherein component (c) is present in an amount of 0.01 to 10 parts by weight per 100 parts by weight of component (a).

4. The primer composition of claim 1, wherein component (d) is present in an amount of 0.1 to 50 parts by weight per 100 parts by weight of component (a).

5. The primer composition of claim 1, which is used in combination with a thermosetting elastomer composition primarily comprising a polymer having at least two alkenyl radicals in a molecule and a perfluoropolyether structure in its backbone.

6. The primer composition of claim 1, wherein component (a) has a molecular weight of about 1,000 to 50,000.

7. The primer composition of claim 1, wherein component (a) is a compound of the formula:

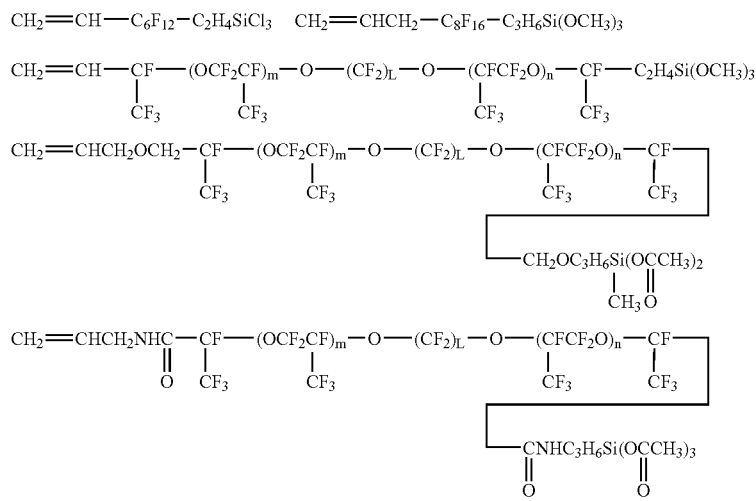

-continued

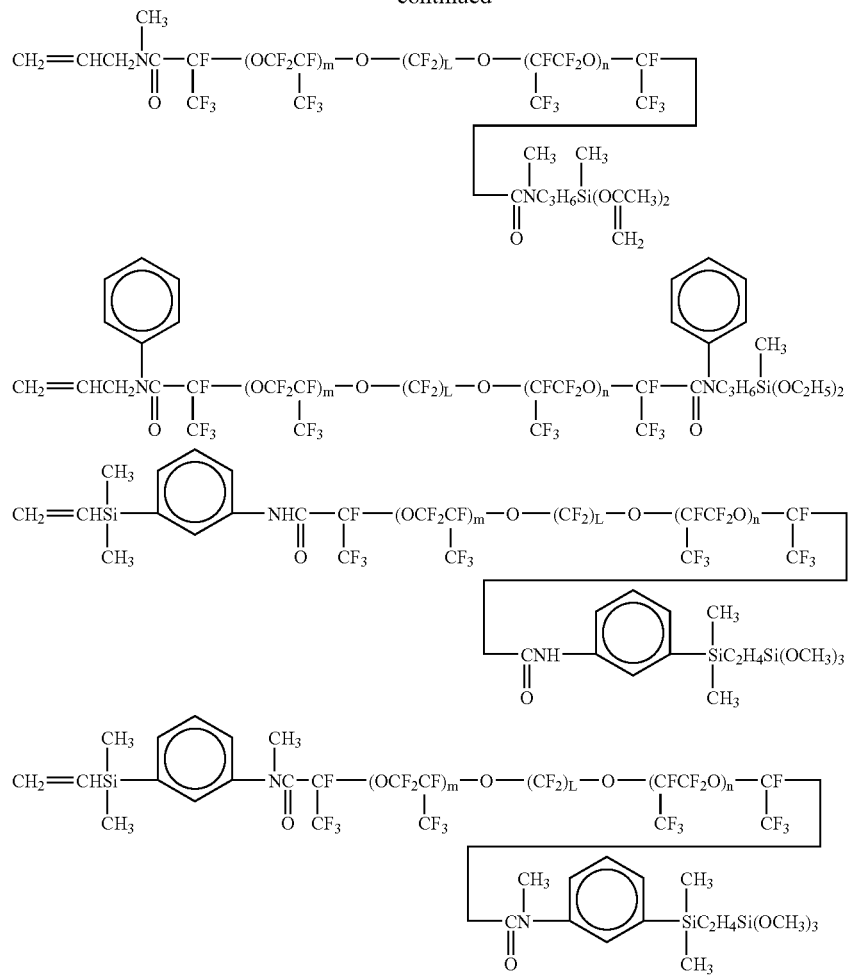

wherein "L" is an integer of 2 to 6, and "m" and "n" each are an integer of 0 to 200.

8. The primer composition of claim 1, wherein component (b) is a compound of the formula:

$$Ti(OR^3)_4$$

wherein $R^3$ is independently a substituted or unsubstituted monovalent hydrocarbon radical of 1 to 10 carbon atoms.

9. The primer composition of claim 1, wherein component (c) is selected from the group consisting of dibutyltin dimethoxide, dibutyltin diacetate, dibutyltin dioctate, dibutyltin dilaurate, dibutyltin dioleate, dibutyltin distearate, dioctyltin diacetate, dioctyltin dilaurate, and diethyltin dioleate.

10. The primer composition of claim 1, wherein component (d) is a compound of the formula:

$$R^4{}_a Si(OR^5)_{4-a}$$

wherein $R^4$ is a $C_1$–$C_{15}$ hydrocarbon radical, $R^5$ is an alkyl radical, and "a" is 0, 1, or 2.

* * * * *